(12) United States Patent
Ellsworth et al.

(10) Patent No.: US 8,798,248 B2
(45) Date of Patent: Aug. 5, 2014

(54) INTELLIGENT CALL LOG AND SCHEDULE INTEGRATION

(75) Inventors: Matthew R. Ellsworth, Erie, CO (US); Jason H. Vick, Denver, CO (US); Tadd F. Wilson, Centennial, CO (US); David Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 47 days.

(21) Appl. No.: 13/316,345

(22) Filed: Dec. 9, 2011

(65) Prior Publication Data

US 2013/0148798 A1 Jun. 13, 2013

(51) Int. Cl.
*H04M 15/00* (2006.01)
*H04M 1/64* (2006.01)

(52) U.S. Cl.
USPC .............. 379/140; 379/88.01; 379/88.11; 379/907; 455/413

(58) Field of Classification Search
USPC ............. 379/1.01, 9.03, 9.04, 14.01, 39.01, 379/32.01, 88.18, 88.23, 88.26, 93.17, 379/93.23, 130, 133, 136, 140, 188, 199, 379/201.07, 201.08, 201.1, 387.01, 88.01, 379/88.11, 88.12, 352, 356.01, 357.05, 379/907; 455/412.2, 413
See application file for complete search history.

(56) References Cited

U.S. PATENT DOCUMENTS

| | | | |
|---|---|---|---|
| 5,535,265 A * | 7/1996 | Suwandhaputra | 379/93.28 |
| 5,805,666 A * | 9/1998 | Ishizuka et al. | 379/1.01 |
| 6,826,397 B1 | 11/2004 | Vasa | |
| 6,829,348 B1 * | 12/2004 | Schroeder et al. | 379/265.09 |
| 6,882,714 B2 | 4/2005 | Mansfield | |
| 6,904,137 B2 * | 6/2005 | Brandt et al. | 379/126 |
| 6,917,610 B1 * | 7/2005 | Kung et al. | 370/352 |
| 7,187,760 B2 * | 3/2007 | Brandt et al. | 379/126 |
| 7,369,651 B2 * | 5/2008 | Brandt et al. | 379/126 |
| 7,450,931 B2 * | 11/2008 | Alston | 455/412.1 |
| 7,746,988 B2 * | 6/2010 | Keohane et al. | 379/88.13 |
| 7,839,987 B1 * | 11/2010 | Kirchhoff et al. | 379/142.02 |
| 7,873,157 B1 | 1/2011 | Sim | |
| 8,102,986 B1 * | 1/2012 | McClintock et al. | 379/210.01 |
| 2005/0207548 A1 | 9/2005 | Moore et al. | |
| 2006/0126806 A1 * | 6/2006 | Trandal et al. | 379/88.26 |
| 2008/0107251 A1 * | 5/2008 | Bedingfield et al. | 379/142.01 |
| 2009/0068979 A1 * | 3/2009 | Alston | 455/405 |
| 2009/0103457 A1 * | 4/2009 | Mamakos | 370/259 |
| 2010/0317328 A1 * | 12/2010 | Halevi | 455/414.1 |
| 2011/0267985 A1 * | 11/2011 | Wilkinson et al. | 370/259 |
| 2011/0286589 A1 | 11/2011 | Mishra et al. | |

* cited by examiner

*Primary Examiner* — Binh Tieu
(74) *Attorney, Agent, or Firm* — Sheridan Ross P.C.

(57) ABSTRACT

Described are embodiments that provide for an intelligent call log. Specifically, in embodiments, a call log module can be provided on a user's phone (or as a sequenced application) that analyzes the actual communications between a calling party and a called party. The call log module is configured, in embodiments, to do analysis of the calling party's interaction with the called party, changes in routing, and/or failure to connect. The call log module is linked to the calling party's schedule information, in some embodiments, for situations with multiple failures to connect and/or multiple short discussions have inadequately dealt with the need to talk, and therefore scheduling a meeting is likely to be more effective.

20 Claims, 7 Drawing Sheets

INTELLIGENT CALL LOG AND SCHEDULE INTEGRATION

BACKGROUND

Currently, call logs record a personal outbound phone call as completed if the caller connects with the individual, their voicemail, or some other coverage path for the called party. Even if the caller did not actually speak to a person in real-time, the call made by the caller is marked as a completed call. Thus, the true status of the call is not captured by the caller's call log. At best, calls are differentiated as inbound, outbound, or missed.

There are predictive dialer systems that have call logs that store more information than ordinary personal outbound call logs. These call logs may include additional detail for compliance with FTC and FCC rules, such as whether the phone call was answered by a human being or a machine, and information about the call. Some predictive dialer systems store a log that describes the results of call attempts, information regarding whether the call was forwarded, and information about whether a call was completed. Current predictive dialer systems may store information such as that a called party doesn't ever answer their phone between the hours of 5:00 pm and 8:00 pm and would, therefore, schedule subsequent outbound communications at times other than between 5:00 pm and 8:00 pm.

Currently, call logs on mobile devices do not provide information regarding the final status of a call. For example, a caller may connect to a called party but then be suddenly disconnected, and there is no information in the call log to indicate to the caller that they should follow up with the called party with another phone call or different communication media. Also, there is no feature that enables scheduling of a call using information from a calling party's and called party's schedule.

Although specific problems and issues have been identified in this background section, the embodiments described herein are not limited to solving these particular problems or issues. The embodiments may be applied to solve problems not described in this background section.

SUMMARY

It is with respect to the above issues and other problems that the embodiments presented herein were contemplated. Embodiments described in the present application provide for an intelligent call log that provides additional information about communication between a calling party and a called party. Some embodiments provide for a call log to include an indication that a calling party should be called back or communicate by some other mode with the called party. The indication may be a result of a phone call that was originally connected but was interrupted due to some event, such as heading into an area with no cell phone coverage, heading into a meeting, or entering a facility that does not allow mobile devices. In these embodiments, the call log includes an indication that the call was interrupted, and that the calling party should try to establish communication with the called party at a later time.

In other embodiments, the call log is used to determine whether a threshold number of calls (outbound or inbound) have been exceeded without a conversation between the calling party and the called party. In these embodiments, a request can be sent by a communication device of the calling party to request scheduling information of the called party to set up a future appointment. In these embodiments, the called party may set up trust arrangements with one or more communication devices of the calling party to allow the communication devices to have access to the schedule information for the called party.

In other embodiments, once the threshold number of calls has been exceeded, the communication device of the calling party will break a connected telephone call with a third-party to allow the calling party to answer a call from the called party. This embodiment illustrates an intelligent use of the call log. In another embodiment, if a calling party A calls a called party B every week after a certain meeting or event and has mixed success with regard to achieving a real time person to person call, the information from the call log can be used to automatically schedule a call every week after the meeting.

Other embodiments link voicemail messages, left by a calling party or received from a called party, to the call log. This allows a user who may have forgotten the reason why they called someone to quickly refresh their memory.

In one embodiment, a method is provided that includes detecting an outbound call from a communication device to a called party. The outgoing call is made using the communication device. The method further includes determining that the outbound call has been connected and that a conversation between the calling party and the called party has been initiated. If the conversation is interrupted, for any number of reasons, the method includes determining that the call has been interrupted. The call log is updated to include an indication of the outbound call and an indication that the call was interrupted. In embodiments, the call log is also updated to reflect that communication should be reestablished with the called party at a later time, such as with an indication of a call back.

The determination of whether a conversation was initiated can be made in a number of different ways. For example, an application on the communication device can determine whether the pattern of voice data transferred to and from the communication device are indicative of a conversation. Also, the determination can be made by analyzing voice data and identifying phrases that are indicative of a conversation such as "Hello, how are you?"

In embodiments, the determination of whether the call was interrupted is also made by analyzing voice data. For example, an application in the communication device can be designed to analyze voice data from the conversation to identify a phrase such as "call me back," "I'm busy," "I'll call you back," "my battery is low," "my battery is dying," etc. Once such a phrase is identified, the call log can be updated to reflect that the call was interrupted and communication with the called party should be reestablished. In addition to analyzing voice data, other information such as the length of the call can also be used to determine whether the call was interrupted. Detection of an interrupted call could also be done via analysis of speech showing that the start of a sentence was followed by silence. A time interval would differentiate between a drop out and a prematurely terminated call.

In some embodiments, instead of simply indicating that the called party should be called back, a determination can be made, such as by the identified phrase (e.g., "I'm in a meeting") that the communication should be established using a different mode. The call log can be updated to reflect that communication with the called party should be reestablished using a different mode such as e-mail, text, Internet messenger, or other modes. This reestablishment may be manually selected or it may be selected automatically based on an analysis of communication preferences of the called party.

Embodiments also provide for using the call log to determine that the calling party and the called party have made a number of unsuccessful attempts to have a phone conversation but have been unable to contact one another for some period of time. In these embodiments, a threshold number of calls (e.g., outbound, inbound, or a combination) can be established, after which different processes are implemented. As one example, a threshold of five attempts (inbound or outbound) can be established, after which a call is automatically scheduled between the calling party and the called party. The automatic scheduling may involve requesting and receiving schedule information of the called party and sending a schedule time and date for the call. As another example, if the threshold has been exceeded, and the called party calls during a time that the calling party is on a call with a third party, the method may include breaking the call with the third party in order to receive the call from the called party. It is noted that the threshold is user programmable and that any number of attempts may be set as the threshold by a user.

Other embodiments include a communication device, with at least one non-transitory computer readable medium; at least one processor; and an application stored in the at least one computer readable medium and running on the processor. The application is configured to detect an outbound call to a called party and whether the outbound call has been connected. The application also determines that the outbound call has been received by a message system and that voice data was sent to the message system, e.g., a voicemail was left on a voicemail system. The application updates a call log to reflect the outbound call and an indication that the outbound call was received by a message system. When the call log is displayed, a link to the voice data that was sent to the message system is also displayed. This allows a user to select the link and quickly hear the voice data, as a reminder of the subject matter of the call, before calling the other party back. In embodiments, the application also displays an indication of whether an inbound call was received from the called party after the voice data was sent. In other words, the call log will include an indication of whether the other party called back after the voice mail message was left.

Other embodiments are directed to non-transitory computer readable media that include computer executable instructions that when executed by one or more processors perform a method. The method includes displaying a call log comprising a plurality of displayed images, wherein at least a portion of the displayed images represent one or more calls made to or received from a called party. The displayed images include an indication of whether a call was connected and whether the call resulted in a conversation with a first called party. In embodiments, the displayed images will include a link to voice data that may have been left on a voice message system for the called party or may have been left by the called party. The images also include in embodiments, an indication of number of inbound calls received from the first called party and a number of outbound calls to the first called party.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are described, it should be appreciated that individual aspects of the embodiments can be separately claimed.

The term "communication device" as used herein refers to any mobile communication device, mobile phone, smart phone, telephone, soft phone, mobile computer, tablet computer, laptop computer, or the like.

The term "communication" as used herein refers to data exchanged between two communication devices, some non-limiting examples including one or more telephone calls, voicemails, emails, instant messages, text messages, multimedia messages, video messages, and the like.

The term "call log" as used herein refers to a collection of information about communications.

The term "conversation" as used herein refers to real-time voice communication between at least two people.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The embodiments provide for a more intelligent outbound call log. Specifically, in embodiments, a call log module can be provided on a user's phone (or as a sequenced application) that analyzes the actual communications between a calling party and called party. The call log module is configured, in embodiments, to do analysis of the calling party's interaction with the called party, changes in routing, and/or failure to connect. The call log module is linked to the calling party's schedule information, in some embodiments, for situations with multiple failures to connect and/or multiple short discussions have inadequately dealt with the need to talk, and therefore scheduling a meeting is likely to be more effective. Although the call log is described below as maintaining information about telephone calls, in other embodiments, the call log may store information regarding other types of communications. These and other features of the embodiments are described below in greater detail.

Figure 1:
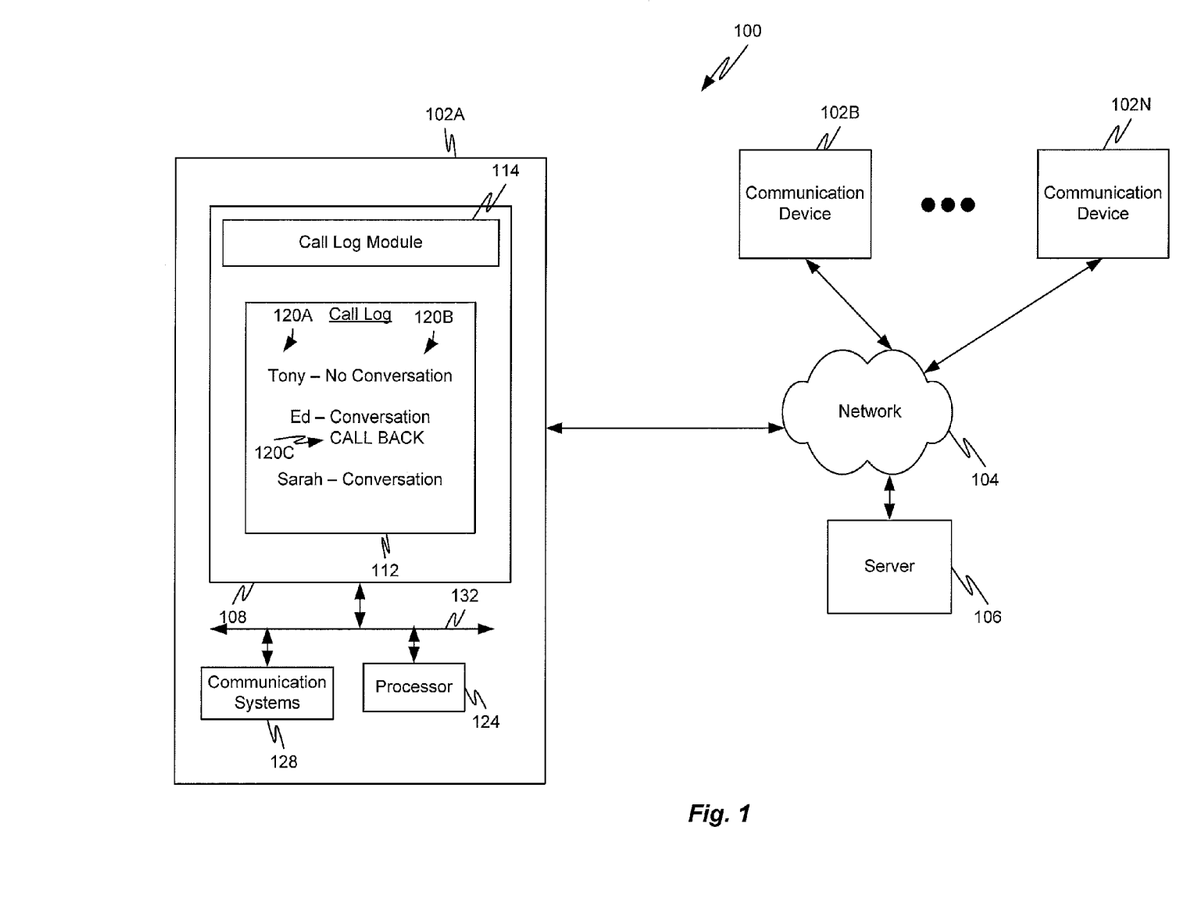
FIG. 1 is a block diagram of a system including a communication device according to an embodiment that includes a call log and call log module.

FIG. 1 illustrates a system 100 that includes communication devices 102A-102N, e.g., mobile phones, smart phones, mobile communications devices, telephones, soft phones, or the like. As illustrated in FIG. 1, communication devices 102A-102N are connected to a network 104 that allows the communication devices 102A-102N to communicate with each other. Also connected to the network 104 is a server 106, which in embodiments is an application server or Web server. Communication device 102A includes a call log module 114 and call log 112, according to an exemplary embodiment.

Communication device 102A includes memory 108, which may store files such as call log 112 and execute application(s) and/or modules such as call log module 114. In embodiments, call log module 114 updates call log 112 with information from telephone calls made to and from communication device 102A. Call log module 114 also utilizes call log 112 to perform other operations such as displaying the call log 112 to a user, scheduling operations, and/or call handling operations, which are described in greater detail below.

In addition to memory 108, communication device 102A also includes additional hardware such as a processor 124, and communication systems 128. The processor 124 is used to execute the code of call log module 114 and other applications stored in memory 108. A bus 132 provides a connection for transmitting signals among the memory 108, processor 124, and communication systems 128. In addition, communication device 102A may also include other input/output devices not shown, including but not limited to display(s), speakers, lights, keypads, and microphones.

It is noted that although call log module 114 and call log 112 are shown in FIG. 1 as stored in memory 108 of communication device 102A, in other embodiments, at least portions of the call log 112 and call log module 114 are stored on a server(s) such as server 106. As one example if call log 112 is stored, at least in part, on server 106, communication device 102A will communicate, using communications systems 128, with server 106 to access information from call log 112 and also to update call log 112. Similarly, portions of call log module 114, such as routines, subroutines, or other code, may be stored on server 106, and will be accessed by communication device 102A when necessary.

Call log 112 according to embodiments of the present disclosure includes information that is typically not available or utilized in conventional call logs on mobile devices. As shown in FIG. 1, call log 112 includes, in addition to other information, information 118 identifying a called party and information 120 indicating whether a conversation (i.e., real-time voice communication) between the calling party, e.g., user of device 102, was initiated with a called party, e.g., user of one of communication devices 102B-102N. This information goes beyond the information in a typical call log, which may merely include information identifying the called party and the date of the call without any indication as to whether or not a conversation was actually initiated with the called party. Other embodiments of the call log 114 may include additional information beyond an indication of whether a conversation was initiated with the called party.

Call log 112, as described in greater detail below, stores information for both outbound and inbound calls. In other embodiments, however, call log 112 may be in fact one or more separate call logs each storing different types of information. For example, call log 112 may in some embodiments be implemented using two different call logs, a first call log used to store information about outbound phone calls, and a second call log for storing information about inbound calls. Additionally, the call log can 112 include communication information not only from calls, but also other modalities of communication such as text messages, instant, messages and the like. This additional information can be integrated into the same call log, or as mention above, stored in one or more separate call logs. Call log 112 is shown and described herein as a single call log merely for purposes of simplicity and embodiments of the present disclosure are not limited thereto. Additionally, while the exemplary embodiments will be discussed in relation to calls, the technology described herein can also be extended to other forms of communication such as text messages, etc.

In operation, a user (the calling party) of communication device 102A may place an outbound call/communication using communication device 102A to a user (the called party)

of communication device such as communication device 102B. Call log module 114 will update call log 112 with information about the outbound call/communication. Call log module 114 may first determine the identity (name or number) of the called party and create a call entry in call log 112 with information 118 identifying the called party. As one example, the called party may be identified as "Tony" based on contact information stored within communication device 102A. Call log module 114 then determines if there was a conversation initiated between the calling party and the called party, and updates call log 112 with the information. As shown in FIG. 1, call log 112 is updated to show that there was no actual conversation with Tony. Information from the call log 112 can be displayed to a user of communication device 102A, who is reminded that no conversation was initiated with Tony.

As one example, the call/communication to Tony may have been redirected to voicemail or some other voice recording service. Traditionally, this would register in an outbound call log as a completed outbound call/communication. However, no actual conversation occurred between the calling party and the called party, namely Tony. In the embodiment in FIG. 1, call log module 114 would detect that there was not a real-time conversation between the calling party and Tony. Call log module 114 would then store information 120 in call log 112 indicating that although a call/communication was made to Tony no conversation was initiated.

Additionally, call log module 114 also stores information 122 (in call log 112) that the called party should be called back. In one embodiment, the indication is a result of call log module 114 determining that a conversation was interrupted. As shown in FIG. 1, the call log 112 shows that the calling party made an outbound call/communication to a called party named "Ed," and that a conversation was initiated. Information 122 is stored in call log 112 indicating that Ed should be called back.

In embodiments, the called party (e.g., Ed) may have asked the calling party to call back/communicate later, or there may have been some other issue that interrupted the conversation between the calling party and the called party, Ed. The call log module 114 may analyze the length of the call/communication or the voice data transmitted and received by communication device 102A to determine if a conversation occurred between the calling party and Ed. The voice data exchanged between the calling party and Ed is analyzed to determine whether to include the information 122, namely that Ed should be called back. In embodiments, the analysis is performed by the call log module 114, which detects phrases spoken by the called party such as "please call me back," "I'm heading into a tunnel," "can't talk now," etc. and updates the call log 112 to reflect that the outbound call/communication resulted in a successful, or partially successful, conversation.

In one embodiment, call log module 114 utilizes speech recognition to determine whether a conversation was initiated between a calling party and a called party. The call log module 114 may include code that utilizes any appropriate models for speech recognition including, but not limited to, acoustic modeling and language modeling. Some examples of approaches that may be utilized by code of call log module 114 include Hidden Markov modeling (HMMs) approaches and dynamic time warping approaches.

As can be appreciated, the call log module 114 may in addition to analyzing the content of the interaction between the calling party and the called party, also be configured to detect (based on call signaling for example) whether the calling party's call/communication was redirected to coverage, voicemail, etc. In embodiments, the call log module 114 also detects EC500 transfers (transfers to other phones) or other types of transfers and includes such information in the call log 114. In another embodiment, call log module 114 utilizes tone detection, e.g., "the beep" to determine whether a calling party was redirected to the voice mail of a called party.

As described in greater detail below, the rich information stored in call log 112 by the call log module 114 can be leveraged in a number of ways. For example, if the calling party's call/communication was directed to a voicemail system and left a voicemail (i.e., voice data), then the call log module 114 could, in embodiments, record the voicemail and link the recorded voicemail with the entry in the call log 112. This could be useful for determining context information or refreshing a user's memory about the reason for the call/communication. Also, if a calling party and a called party have exchanged multiple voicemails, then the multiple outbound and inbound "missed calls/communications" could be linked to voicemails and the entire exchange of voicemails could be compiled and provided to either the calling party or the called party prior to a later attempted phone call/communication, to enhance the calling party or called party's context awareness of the conversation which occurred over voicemail.

In other embodiments, for multiple unsuccessful attempts at a conversation, the information stored in call log 112 by call log module 114 could be used as a stimulus to request schedule information access. The schedule information may be stored in a calendar application for example Microsoft Outlook®, or its equivalent. The schedule information is then used, in these embodiments, to determine when the next open time for the parties attempting to reach each other. Such access could be based on trust, enterprise membership, and/or other permissions. The threshold for failed attempts before the schedule negotiation is invoked could be set by the calling party and/or called party to minimize ineffective messages.

As also described in greater detail below, the data maintained in the call log 112 could also be leveraged to set breakthrough preferences. For example, if a calling party has unsuccessfully tried calling the called party a number of times, say three or four times, and each time has instead connected with voicemail If such a condition is detected by the call log module 114, then the calling party may want to allow the called party to breaktough, or interrupt another conversation (or possibly assign the called party a different ringtone if the number of unsuccessful calls/communications to the called party exceeds a particular threshold). These breakthrough or ringtone preferences may be provisioned on the calling party's communications device, e.g., communication device 102A, based on the information stored in call log 112.

The data maintained in the call log 112 may also be leveraged to set up auto tasks for a new call/communication at some point in the future, as described in greater detail below. Specifically, a reminder or automated outbound call/communication to a called party could be automatically scheduled if more than a predetermined number of unsuccessful outbound (or combined outbound and inbound) calls/communications are detected between a calling party and a called party by call log module 114.

Figure 2:
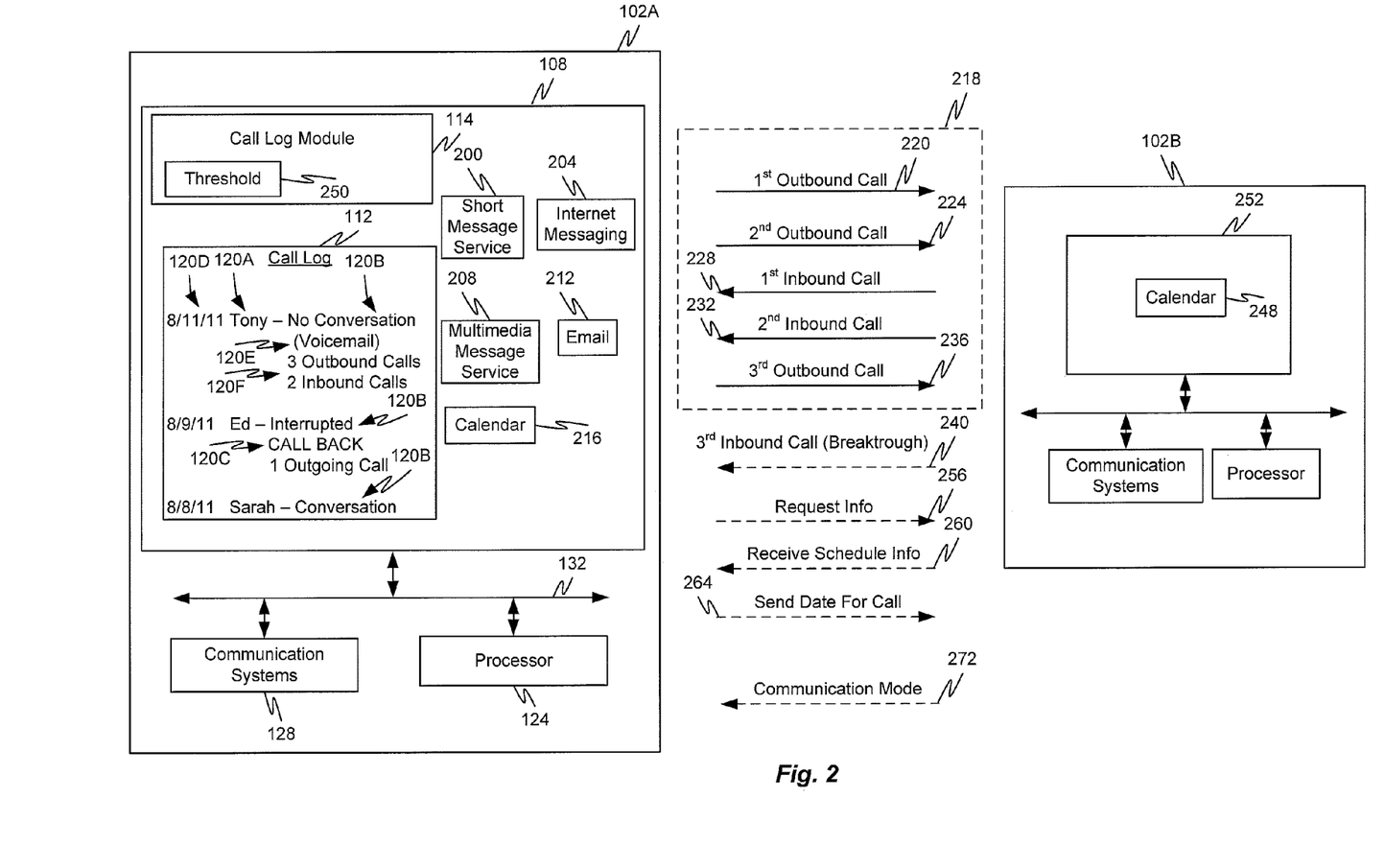
FIG. 2 is a block diagram showing a first communication device, according to an embodiment, making outbound calls and receiving inbound calls with a second communication device.

FIG. 2 illustrates communication device 102A making outbound calls/communications and receiving inbound calls/communications, from communication device 102B. As shown in FIG. 2, communication device 102A includes some additional features not shown in FIG. 1. As shown in FIG. 2, communication device 102A includes call log module 114 and call log 112, which is storing more information than shown in FIG. 1.

As shown in FIG. 2A, communication device 102A also includes a number of different applications in memory 108. Some examples illustrated in FIG. 2 include applications providing a short message service 200, an Internet messaging 204, a multimedia message service 208, an e-mail 212, and a calendar 216. As described in greater detail below, the information within call log 112 can be utilized to provide features using the short message service application 200, Internet messaging application 204, multimedia message service application 208, e-mail application 212, and calendar application 216, to provide features to communication device 102A not currently available in other mobile devices.

Referring to call log 112, in addition to information 118-122 shown in FIG. 1, it also stores a date 140A-C of a call/communication to or from the called party (in some embodiments the date is the date of the latest call/communication to or from the called party), information 144 indicating whether voicemail information was left by the calling party or the called party, and information 148 indicating the number of outbound and inbound calls/communications made between the calling party and the called party.

As shown in FIG. 2, information 120A-B, which generally indicates whether a conversation was initiated between the calling party and the called party, includes more specific information than the information 120 shown in FIG. 1. For example, the information may indicate whether a conversation was initiated (120C), whether a conversation was interrupted (120B), and/or whether no conversation was initiated (120A). Shown in FIG. 2 is an entry with the date Aug. 11, 2011 that includes information 120A indicating that no conversation was initiated between the calling party and Tony. In contrast, the entry of Aug. 9, 2011 includes information 120B indicating that a conversation was initiated but was "interrupted," and further includes information 122 indicating that Ed should be called back/communicated with later. The entry of Aug. 8, 2011 includes information 120C indicating that a conversation with Sarah occurred.

As indicated above, call log module 114 may determine information 120A-C using any appropriate software, code, and/or algorithm to determine whether a conversation was initiated and/or interrupted. In embodiments, call log module 114 utilizes speech recognition of voice data of the calling party and the called party, call/communication length, and/or transfers of calls/communications to other phones or voice recording systems to determine whether a conversation is initiated between the calling party and the called party and also whether the call/communication is interrupted.

As one example, referring now to entry dated Aug. 9, 2011 in call log 112, the calling party may have initiated a call/communication to Ed on Sep. 9, 2011. During the call/communication, call log module 114 determined that although real-time communication, e.g., a conversation, was initiated with Ed, it was interrupted. Therefore, call log module 114 stored information 120B, in call log 112, indicating that the conversation with Ed was interrupted and information 122 indicating that Ed should be called back/communicated with later.

In embodiments, the call log module 114 uses the call/communication length in combination with speech recognition to determine that the conversation with Ed was interrupted. The call log module 114 analyzes the voice data being transmitted from the calling party and being received from the called party, namely Ed. The call log module 114 looks for predetermined phrases and patterns that indicate that a conversation was initiated between the calling party and Ed. For example, the call log module 114 may determine that voice data was exchanged between the calling party and Ed. In addition, the call log module 114 may also analyze the exchanged voice data for phrases that are common in conversations that are interrupted, non-limiting examples including "call me back;" "I'll call you back;" "I'm in the middle of something;" "I might drop you;" "bad reception;" "I'm going into a meeting;" etc. In response to recognizing these phrases and determining that the call/communication was very short, e.g. several seconds, the call log module 114 stores the information 120B and the information 122 for the Aug. 9, 2011 entry in call log 112 as shown in FIG. 2.

In embodiments, information from call log 112 is used to perform a number of different tasks and functions. To illustrate one example, the information from the entry dated Aug. 11, 2011 in call log 112 is used to schedule a call/communication with a called party, namely Tony. The information under the entry dated Aug. 11, 2011 is cumulative information from a number of exchanged phone calls/communications 218 between the calling party utilizing communication device 102A and the called party (Tony in this example) utilizing the communication device 102B.

As shown in FIG. 2 the phone calls/communications 218 begin with a first outbound call/communication 220 made by the calling party to Tony. In this example, no conversation was initiated between the calling party and Tony. The call log module 114 stores the information in call log 112. Following the first outbound call/communication 220, a second outbound call/communication 224 is made by the calling party to Tony. Again, no conversation is initiated. In this example however, the calling party leaves a voicemail message for Tony on communication device 102B. The information about the second outbound call/communication 224 is stored by call log module 114 in call log 112, including information that a voicemail message was left. The voicemail message may also be recorded and stored on communication device 102A.

Thereafter, the communication device 102A of the calling party receives a first inbound call/communication 228 from Tony sent from communication device 102B. Again, in this example no conversation is initiated between the calling party and Tony, and call log module 114 stores information about the first inbound call/communication 228 in call log 112. The first inbound call/communication 228 is followed by a second inbound call/communication 232, which does not result in a conversation between the calling party and Tony. Information about the second inbound call/communication is stored in call log 112. Finally, on Aug. 11, 2011 a third outbound call communication 236 is made by the calling party to Tony. The third outbound call/communication 236 also fails to result in a conversation between the calling party and Tony. The information about the third outbound call/communication is also stored in call log 112.

As is shown in the entry of Aug. 11, 2011 in call log 112, the cumulative information from the exchanged phone calls/communications 218 is stored within call log 112. This information includes the date 140A of the third outbound call/communication 236, information 144 indicating that a voicemail was left by the calling party, and information 148 indicating that 3 outbound and 2 inbound calls/communications have been made between the calling party and the called party.

In one embodiment, call log module 114 stores a threshold 250 of a number of calls/communications that have been made between the calling party and a called party without initiating a conversation. The threshold 250 is used in some embodiments to initiate tasks or other features to ensure that once the threshold is met, or exceeded, a conversation is established between the calling party and a called party as quickly as possible. In some embodiments the threshold 250 may be preprogrammed into device 102A. In other embodiments, threshold 250 is set by a user of device 102A as a setting that can be changed. The user is able in some embodiments to establish different thresholds for different called parties. In other words, the calling party may be able to specify a lower threshold for work-related contacts, either individually or as a group, and a higher threshold for parties that are personal contacts, either individually or as a group.

Continuing with the example above, the threshold 250 may be set at four phone calls/communications between the calling party and the called party. As indicated in the example above, the number of exchanged phone calls/communications 218 between the calling party and Tony is at five which exceeds the threshold 250. As a result, two different features may be implemented to ensure that the calling party quickly initiates a conversation with Tony.

Some embodiments provide for a "breakthrough" feature, which provide that once threshold 250 (for the number of phone calls/communications made between the calling party and a called party) is reached, or exceeded, any inbound call/communication from the called party, e.g., Tony, takes precedence over a currently connected call/communication. For example, as shown in FIG. 2, communication device 102A receives a third inbound call/communication 240 from Tony. In this example, the calling party is currently on a call/communication with a third-party. Call log module 114 determines that phone calls/communications between the calling party and Tony have exceeded the threshold 250, and as a result the call/communication with a third-party is disconnected and the third inbound call/communication 240 is allowed to breakthrough so that the calling party may initiate a conversation with Tony. Prior to disconnecting the third-party call/communication, in some embodiments, a warning may be displayed to the calling party so that the calling party can notify the third-party that the call/communication is about to be disconnected.

As can be appreciated, in other embodiments, the breakthrough feature may not abruptly terminate the call/communication with a third-party, but may instead display an icon or other image that queries the calling party whether the third inbound call/communication 240 should be accepted. The icon or image may include information indicating that the threshold 250 with respect to this called party has been met or exceeded.

In yet other embodiments, device 102A may be configured so that if threshold 250 is met, third inbound call/communication 240 results in a different ring tone, display feature, vibration, light (color or blinking pattern), or other output that distinguishes the third inbound call/communication 240 from other inbound calls/communications. The calling party is notified by the distinguishing output that the call/communication is not merely an ordinary inbound call/communication but from a called party with whom the threshold 250 of calls/communications has been met or exceeded.

Threshold 250 may also be used in a scheduling feature. As one example, once the threshold 250 is met, call log module 114 will begin a process of scheduling a call/communication between the calling party and the called party with which the threshold 250 has been met. As shown in the embodiment of FIG. 2, once the threshold 250 has been met, call log module 114 uses communication systems 128 to automatically transmit a message 256 to communication device 102B. The message 256 includes a request for schedule information for Tony. In some embodiments, the request may provide some parameters for scheduling the phone call/communication. For example, there may be a predetermined period of time within which the phone call/communication should be scheduled. The predetermined period of time can be based in some embodiments on some default value or a setting input by the user of device 102A.

In response, communication device 102B accesses schedule information, such as from calendar application 248 stored in the memory 252 of communication device 102B. The schedule information includes available times and dates for Tony to have a conference call/communication with the calling party. In those embodiments in which a predetermined period of time is included in message 256, the schedule information retrieved by communication device 102B will reflect the predetermined period of time. Communication device 102B then sends the schedule information in a message 260 to communication device 102A. Call log module 114 can then use the received schedule information, and schedule information from the calling party retrieved from calendar application 216, to determine what are the most convenient days and times for scheduling a phone call/communication. Once the most convenient date and time is determined, communication device 102A sends a message 264 with the scheduled date and time for the call/communication.

The scheduling feature conveniently arranges a time for the calling party and the called party (e.g., Tony) to have a conversation without the need for either party to manually send scheduling information. It is noted that because this feature entails the exchange of what could be considered private schedule information, there may be a preliminary step where the parties provide authorization for exchanging the schedule information. For example, calendar applications 216 and 248 may include settings for sharing schedule information with various contacts. The setting can be set to allow exchange of schedule information only for those contacts specifically indicated by a user (i.e., the calling party or the called party). The setting can be used to determine whether the called party's schedule information is sent in response to message 256.

In some embodiments, communication device 102B will send a message 272 indicating a different communication mode for communicating with the called party. The communication mode may indicate for example, that the calling party should try to contact the called party using a different communication mode or media, non-limiting examples including: short message service (SMS), multimedia message service (MMS), Instant Messaging (IM), electronic mail (email), and/or a social network.

Message 272 may be sent in different situations. For example, message 272 may be sent in response to a request by communication device 102A for communication device 102B to send a preferred communication mode for contacting the calling party. Communication device 102A may send the request as a result of threshold 250 being met or exceeded. In other embodiments, message 272 is sent in response to receiving first outbound call/communication 220. The calling party may be busy when communication device 102B receives first outbound call/communication 220. As a result, message 272 is sent to inform the calling party that a different communication mode may be more convenient for communicating with the called party at this time. The information within message 272 is stored within call log 112.

Figure 3:
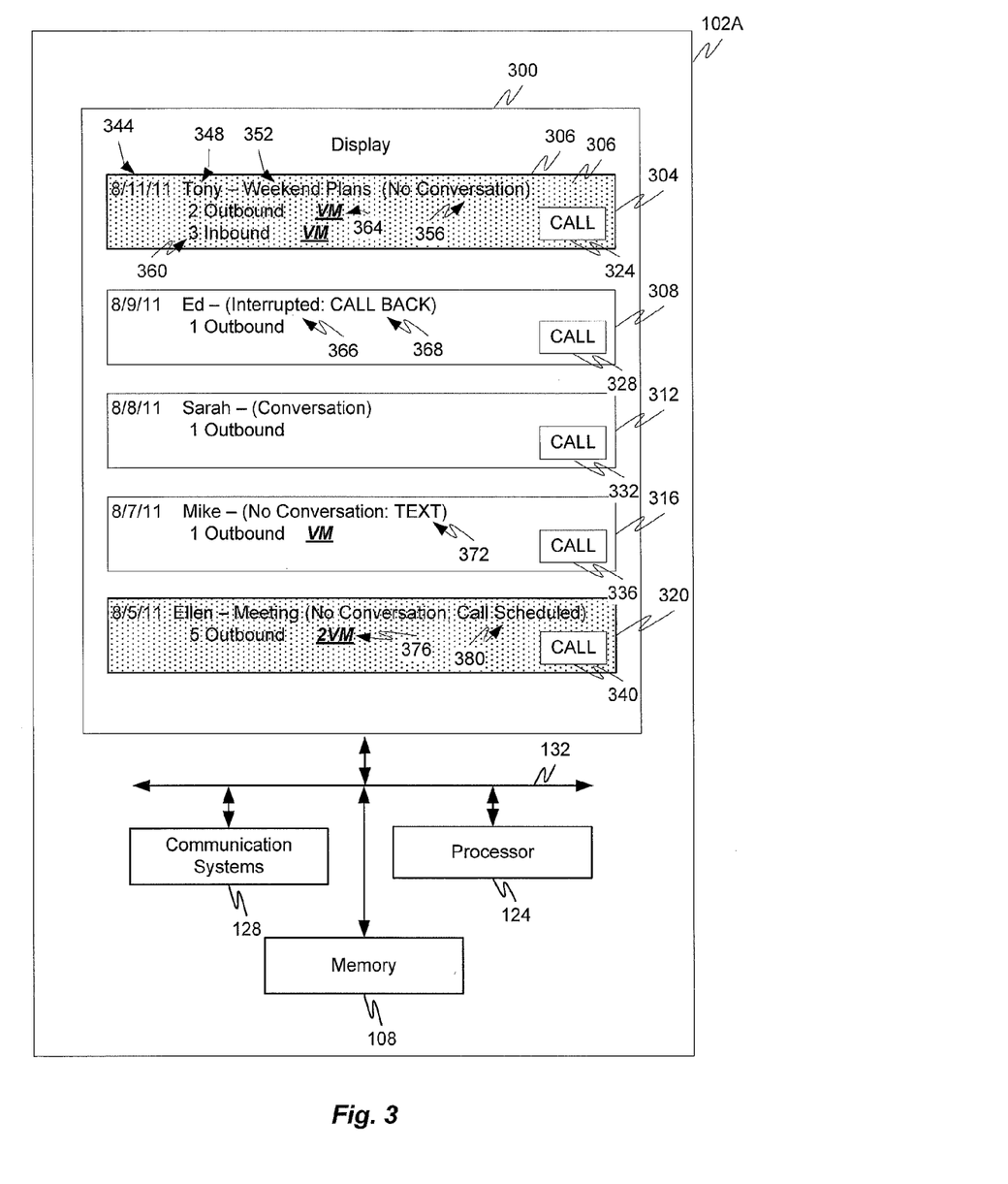
FIG. 3 illustrates a display displaying a call log according to an embodiment.

FIG. 3 illustrates a display 300 displaying information that is stored in a call log according to an embodiment. In the embodiment shown in FIG. 3, device 102A includes the display 300 where information can be displayed to a user. Shown on display 300 is information from a call log such as call log 112. It is noted that although the information is displayed in a particular format, embodiments of the present disclosure are not limited thereto. The format shown in FIG. 3 is used for explanatory purposes only and is intended to illustrate one embodiment of how information stored in a call log, such as call log 112 can be displayed to a user to provide information to a user not available on conventional call logs.

Display 300 displays a number of images which represent one or more calls/communications between a calling party and a called party. For example, boxes 304, 308, 312, 316, and 320 each represent one or more calls/communications between a calling party and a different called party. Within each of boxes 304, 308, 312, 316, and 320 additional images or text can be displayed to provide information regarding the phone calls/communications to and from the called party. For example, within each of boxes 304, 308, 312, 316, and 320, is a "CALL" icon (324, 328, 332, 336, and 340). A user can select this icon which results in communication device 102A making a call/communication to the associated called party.

In addition to the "CALL" icon (324, 328, 332, 336, and 340), each of boxes 304, 308, 312, 316, and 320, include information such as a date 344, the name of the called party 348, and a subject 352 associated with the series of calls/communications with the called party. In one embodiment, subject 352 can be determined using voice recognition analysis of phone calls/communications between the called party and the calling party.

Any information stored in call log 112 can be displayed to a user. This information can include: information of whether a conversation has taken place (indication 356), the number of outbound and inbound calls/communications (indication 360) to and from the called party, whether voicemail messages were left by either the called party of the calling party (indication 364), whether a call/communication with the called party was interrupted (indication 366), whether the called party should be called back/communicated with later (indication 368), whether a different mode of communication should be used to communicate with the called party (indication 372), and/or whether a call/communication has been scheduled with the called party (indication 380).

In some embodiments, indication 364 (indicating whether voicemail messages have been left by either the called party of the calling party) is linked to voice data from the voicemail messages. That is, a user can select indication 364 and listen to the voice data from the voicemail messages. In some embodiments, in response to a selection of indication 364, a menu is displayed with options that allow the user to select and listen to the voice data.

One additional feature shown in FIG. 3 is highlighting of boxes 304 and 320. The highlighting indicates to the user that the threshold has been met or exceeded with respect to a called party. Highlighting provides a quick way for the user to identify those called parties needing more urgent attention. As can be appreciated, highlighting can be used to indicate other information from a call log in addition to, or instead of, whether a threshold has been exceeded. For example, instead of indication 356, highlighting can be used to indicate that the calling party has not been able to initiate a conversation with a called party, or that a call/communication has been scheduled with the called party. The highlighting is shown in FIG. 3 as shading, but in other embodiments is effected through color, lighting, shading, and/or formatting of text.

Although FIG. 3 illustrates a specific format for displaying information from a call log, the embodiments of the present disclosure are not limited thereto. In some embodiments, information from a call log may be displayed differently and still fall within the scope of the present disclosure.

Figure 4:
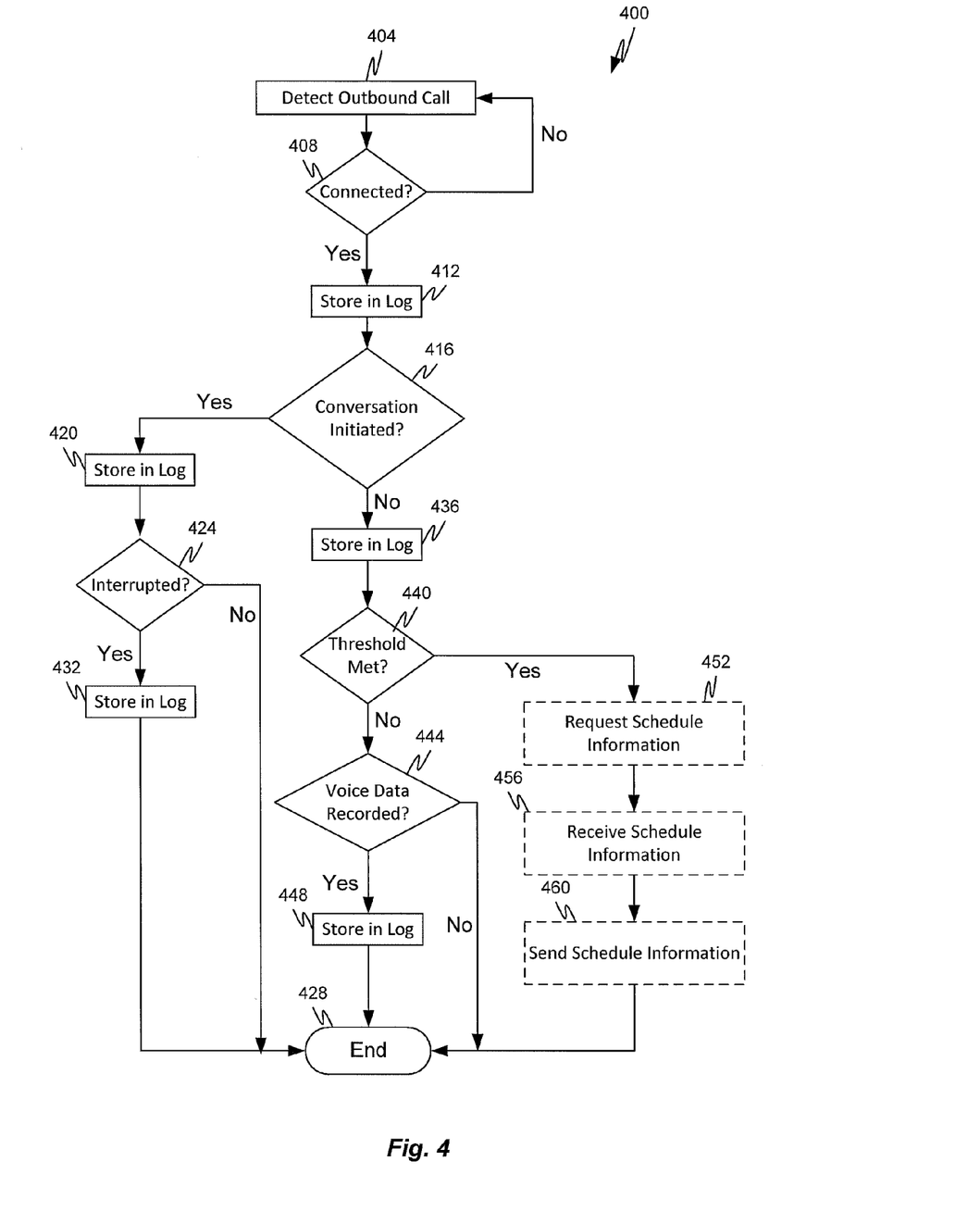
FIG. 4 is a flow diagram of an embodiment of a process for updating a call log based on an outbound call.

Referring now to FIG. 4, a flow diagram 400, for storing information in a call log about an outbound call/communication, is shown and will be described. Flow 400 is in embodiments performed by a computing device such as communication device 102A (FIGS. 1-3). More specifically, one or more hardware or software components may be involved in performing flow 400. For example, portions of flow 400 may be performed by a call log module such as call log module 114 described above.

Flow 400 begins with step 404 where an outbound phone call/communication is detected. Flow passes from step 404 to step 406 where information regarding the outbound call/communication is stored. The information may include for example the phone number, the date, the name of the called party, and/or other information. Flow passes from step 406 to decision 408 where a determination is made as to whether the call/communication is connected. If for example a network is not available or there is some other problem, the determination is made at decision 408 that the call/communication was not connected. Flow 400 then passes back to step 404.

If at decision 408 a determination is made that the call/communication was connected, flow passes to step 412 where the information regarding the connected call/communication is stored in a call log such as call log 112. Flow passes from step 412 to a decision 416 where a determination is made as to whether a conversation with the calling party was initiated. Decision 416 may be performed using different types of data such as voice recognition data or other information such as the length of the outbound call/communication.

If at decision 416, a determination is made that a phone conversation was initiated, flow 400 passes to step 420 where the information indicating that a conversation was initiated is stored in the call log. Following step 420 is decision 424 where a determination is made as to whether the conversation was interrupted. The determination made at decision 424 involves, in embodiments, analyzing voice data from the conversation and identifying phrases that indicate that the phone call/communication has been interrupted. If a determination is made that the phone calls/communications have not been interrupted, flow 400 ends at 428.

If at decision 424 a determination is made that the call/communication has been interrupted, flow 400 passes to step 432 where an indication that the call/communication is been interrupted is stored in the call log. In addition to the indication that the call/communication was interrupted, an indication that the called party should be called back/communicated with later can also be stored in the call log.

Referring again to decision 416 if a determination is made that a conversation was not initiated, an indication that a conversation was not initiated is stored in the call log at step 436. Flow passes from step 436 to decision 440 where the determination is made as to whether a threshold number of calls/communications between the calling party and the called party has been met or exceeded. Decision 440 may involve accessing information from the call log to determine how many calls/communications have been exchanged between the calling party and the called party and whether that number of calls/communications meet or exceed the threshold. If the threshold has not been met, flow passes to decision 444 where a determination is made as to whether voice data was recorded, i.e., whether the calling party left a voicemail message on an answering system. If no voice data was recorded, flow ends at 428. However, if voice data was recorded, then information is stored in the call log indicating that voice data was recorded. Also, in some embodiments the voice data may be stored on the communication device performing flow 400. Storing the voice data locally allows a user to listen to the voice data at a later time. Flow 400 then ends at 428.

Referring back to decision 440, if a determination is made that the threshold has been met, flow 400 passes to step 452 where a request is sent for schedule information. The request is sent to a communication device that stores schedule information for the calling party. In embodiments, the request is sent to the same phone to which the outbound call/communication was transmitted. In other embodiments, the request may be sent to some other device, e.g., a computer associated with the called party that stores schedule information for the called party.

Step 452 is followed by step 456 where schedule information for the called party is received. The schedule information received at step 456 can be compared to schedule information stored locally for the calling party. Using the combined schedule information, a date and time is automatically selected or scheduling a call/communication between the calling party in the called party. At step 460 the selected date and time is sent to the calling party. Flow 400 then ends at 428.

Figure 5:
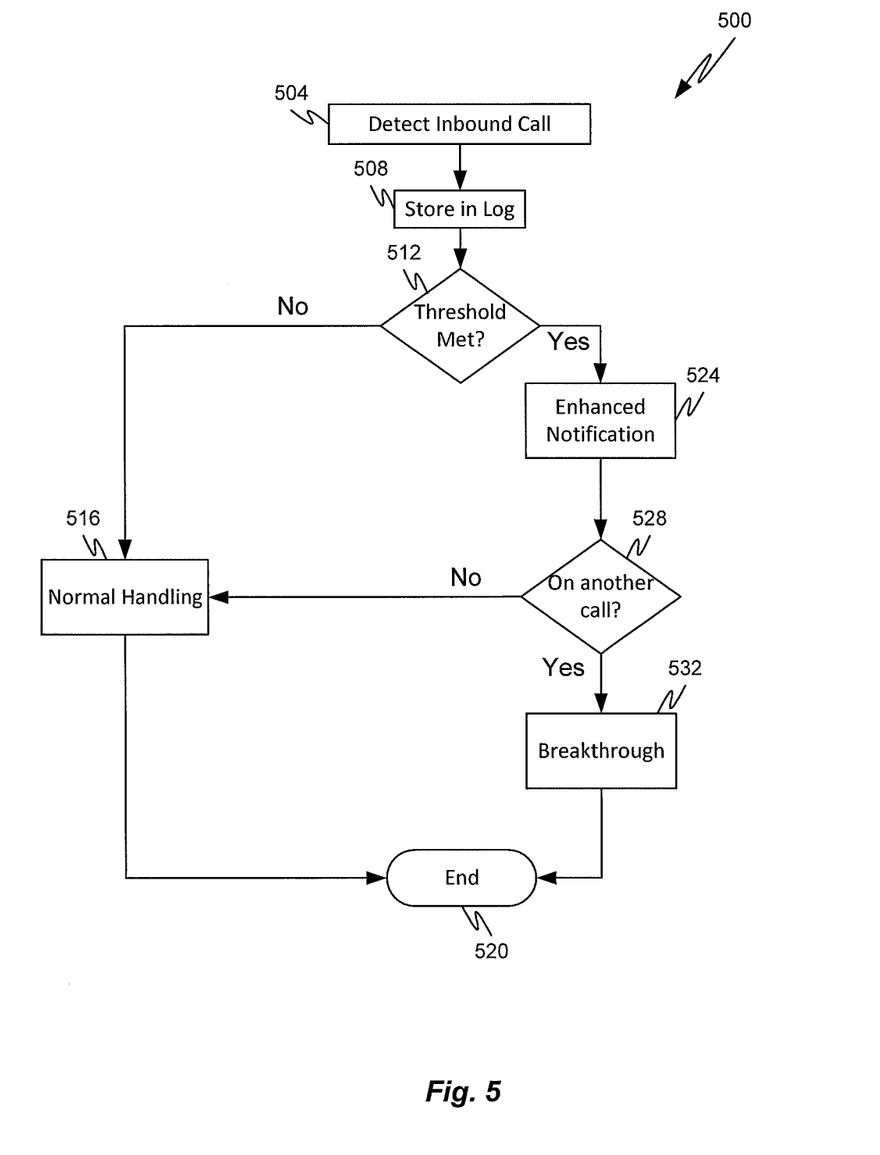
FIG. 5 is a flow diagram of an embodiment of a process for updating a call log based on an inbound call.

FIG. 5 illustrates a flow diagram 500 for storing information in a call log about an inbound call/communication. Flow 500 is in embodiments performed by a computing device such as communication device 102A (FIGS. 1-3). More specifically, one or more hardware or software components may be involved in performing flow 500. For example, portions of flow 500 may be performed by a call log module such as call log module 114 described above.

Flow 500 begins with step 504 where an inbound phone call/communication is detected. Flow passes from step 504 to step 508 where information regarding the inbound call/communication is stored. The information may include for example the phone number, the date, the name of the caller, and/or other information. Flow 500 passes from step 508 to decision 512 where a determination is made as to whether a threshold number of calls/communications (without a conversation) between the party making the call/communication and the party receiving the inbound call/communication has been met or exceeded. If at decision 512 a determination is made that the threshold has not been met, flow 500 passes to step 516 where the inbound call/communication is handled normally. Flow 500 ends at 520.

If at decision 512, a determination is made that the threshold has been met, flow 500 passes to step 524 to provide an enhanced notification to the user of device 102A. Step 524 may involve using indicators that are different than those used with a normal call/communication. Some examples including different ring tones, different lighting patterns or colors, and/or different vibration patterns.

Flow passes from step 524 to decision 528 where a determination is made whether the device 102A is connected to another call/communication with a third-party. If at decision 528 a determination is made that device 102A is not connected to another call/communication, flow passes to step 516 where the inbound call/communication is handled normally. Flow 500 then ends at 520. However if at decision 528 a determination is made that device 102A is connected to another call/communication, flow passes to step 532 where a breakthrough operation is performed.

Step 532, in embodiments, involves a number of sub-steps including disconnecting the call/communication with the third-party to allow the inbound call/communication to be answered. In some embodiments, step 532 also involves displaying an indication to the user of device 102A informing the user of the impending disconnect of the call/communication with a third-party. A user can in some embodiments elect not to allow the incoming call/communication to be answered, and also not allow the call/communication with the third-party to be disconnected. Flow 500 ends at 520.

Figure 6:
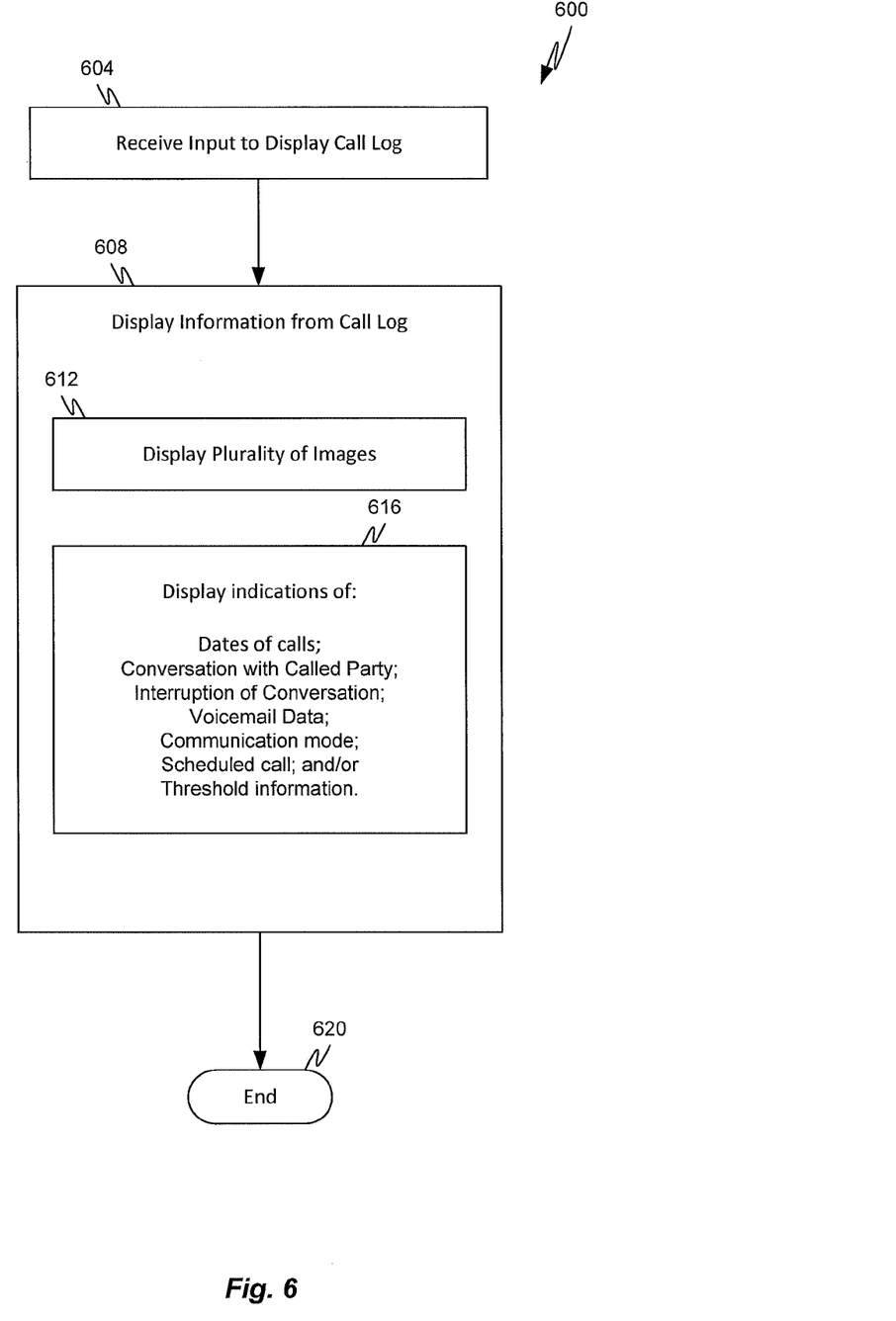
FIG. 6 is a flow diagram of an embodiment of a process for displaying a call log.

FIG. 6 illustrates a flow diagram 600 for displaying information in a call log. Flow 600 is in embodiments performed by a computing device such as communication device 102A (FIGS. 1-3). More specifically, one or more hardware or software components may be involved in performing flow 600.

Flow 600 begins with step 604 where input is received to display information from a call log. Step 604 may involve for example the user selecting an option, from a displayed menu, to display a call log. Flow passes from step 604 to step 608 where information from the call log is displayed. Step 608 involves a number of sub-steps. For example, sub-step 612 includes displaying a plurality of images. The images may represent calls/communications received to and from a called party, such as boxes 304, 308, 312, 316, 320, shown in FIG. 3. Sub-step 616 involves displaying indications of a number of different types of information, including without limitation, dates of calls/communications, whether a conversation has taken place with a called party, whether voicemail messages were left by either the called party or the calling party, whether a call/communication with the called party was interrupted, whether a different mode of communication should be used to communicate with the called party, and/or whether a call/communication has been scheduled with the called party. These are merely some examples of indications that correspond to information stored within the call log that can be displayed at step 608. It is noted that any information stored within the call log can be displayed as images or text to indicate to a user the information within the call log. Flow 600 ends at 620.

The following description of flows 400, 500, and 600 is made for illustrative purposes only. It is noted that in embodiments, flows 400, 500, and 600 may include additional steps not shown in FIGS. 4-6. Also, in some embodiments, the steps of flows 400, 500, and 600 may be performed in different order, in parallel, and/or substantially simultaneously. The present disclosure is not limited to the specific description above of flows 400, 500, and 600 and its steps.

Figure 7:
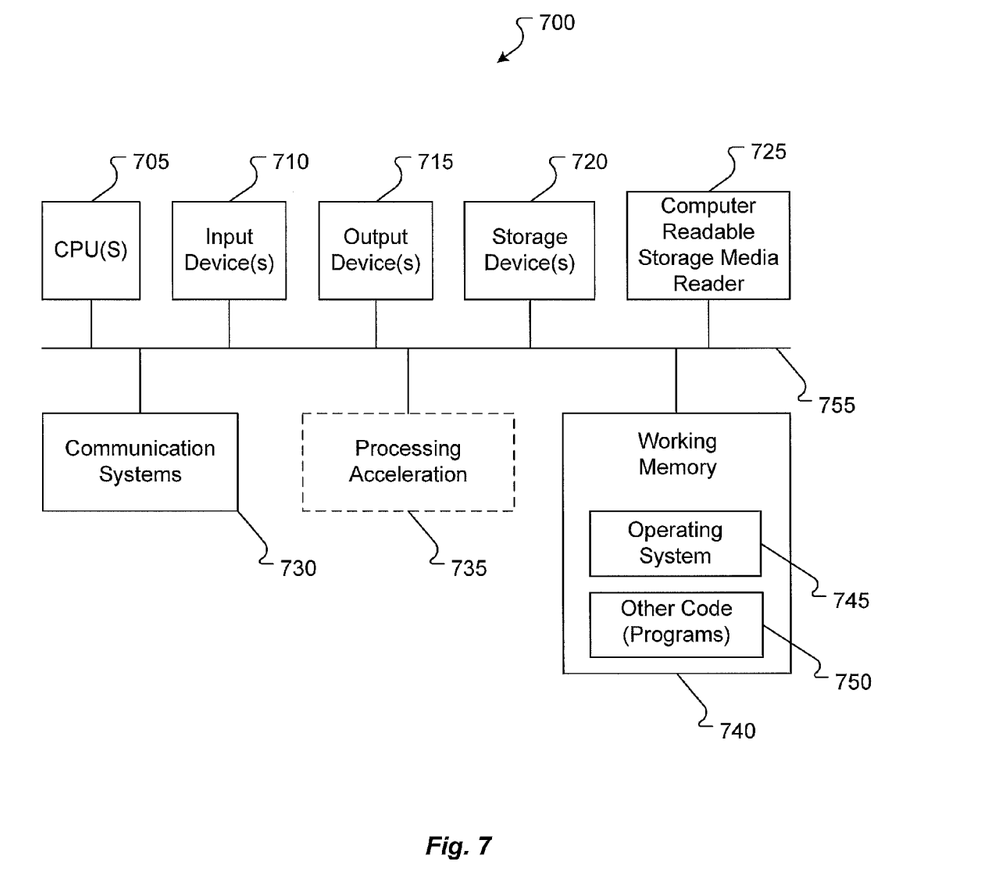
FIG. 7 is a block diagram of an embodiment of a computer or computing system environment operable to execute as the one or more devices described herein.

FIG. 7 illustrates one embodiment of a computer system 700 upon which servers or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable media reader 725 can further be connected to a computer-readable medium, together (and, optionally, in combination with storage device(s) 720) comprehensively representing remote, local, fixed, and/or removable storage devices plus a computer-readable medium for temporarily and/or more permanently containing computer-readable information. The communications system 730 may permit data to be exchanged with the network 520 and/or any other computer described above with respect to the system 700.

The computer system 700 may also comprise software elements, shown as being currently located within a working memory 740, including an operating system 745 and/or other code 750, such as application code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a machine readable medium such as storage medium A processor(s) may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method, comprising:
   detecting a communication from a communication device to a called party, wherein the detected communication is made using the communication device;
   determining that the detected communication has been interrupted, wherein the determination is made, by analyzing voice data of the communication to identify a phrase that reflects the communication was interrupted;
   describing the detected communication in a call log for the communication device; and
   indicating in the call log that the detected communication was interrupted.

2. The method of claim 1, wherein the detected communication is one or more of a call, email, text message, or multimedia message.

3. The method of claim 1, wherein the detected communication is an outbound call.

4. The method of claim 1, wherein the detected communication is an outbound call and the method further comprises: determining that a conversation has been initiated by analyzing a length of the outbound call.

5. The method of claim 1, wherein the communication is one of a plurality of calls, and wherein the plurality of calls comprises one or more outbound calls made to the called party or inbound calls received from the called party.

6. The method of claim 5, further comprising:
   determining that the plurality of calls has exceeded a threshold number of calls; and
   in response to the determining that the plurality of calls has exceed a threshold number of calls, requesting schedule information of the called party to schedule a call back to the called party.

7. The method of claim 6, further comprising:
   receiving schedule information of the called party.

8. The method of claim 7, further comprising:
   sending schedule information.

9. The method of claim 5, further comprising:
   determining that the plurality of calls has exceed a threshold number of calls; and
   in response to the determining that the threshold number of calls has been exceeded, breaking a call with a third party in order to receive a call from the called party.

10. The method of claim 1, wherein the indicating in the call log that the detected communication was interrupted includes indicating that the called party should be communicated with at a later time.

11. The method of claim 1, further comprising recording the detected communication.

12. A communication device, comprising:
   a non-transitory computer readable medium;
   a micro processor; and an application stored in the computer readable medium and running on the micro processor, wherein the application:
  detects an outbound communication from the communication device to a called party;
  determines that the detected outbound communication has been received by a message system and that voice data was sent to the message system;
  describes the detected outbound communication in a call log of the communication device;
  indicates in the call log that the detected outbound communication was received by the message system; and
  when displaying the call log, displays a link to the voice data.

13. The communication device of claim 12, wherein the application, when displaying the call log, displays an indication of whether an inbound communication was received from the called party after the voice data was sent.

14. The communication device of claim 12, wherein the detected outbound communication is one of a plurality of calls, and wherein the plurality of calls comprises one or more calls made to the called party or received from the called party.

15. The communication device of claim 14, wherein the application further:
  determines that the plurality of calls has exceed a threshold of calls; and
  in response to the determining that the plurality of calls has exceeded a threshold of calls, schedules a time within a predetermined period of time to communicate with the called party.

16. The communication device of claim 12, wherein the application further indicates a communication mode for a later communication with the called party.

17. The communication device of claim 16, wherein the communication mode is one or more of: SMS, MMS, email, IM, or voice communication.

18. A computer readable medium including computer executable instructions stored onto the computer readable medium which, when executed by one or more processors of a computer, causes the computer to perform a method for providing a call log, the method comprising:
  displaying the call log comprising a plurality of displayed images, wherein at least a portion of the displayed images represent one or more completed calls from a calling party to a called party;
  wherein at least one of the plurality of displayed images comprises:
    an indication of whether a completed call resulted in a voice conversation between the calling party and the called party, wherein the indication of whether the completed call resulted in a voice conversation between the calling party and the called party is based on at least one of:
      a determined pattern of voice data in the voice conversation between the calling party and the called party that is indicative of a conversation; and
      identifying voice data in the voice conversation between the calling party and the called party to identify phrases that are indicative of the conversation.

19. The computer readable medium of claim 18, wherein at least one of the portion of displayed images further comprises a link to voice data.

20. The computer readable medium of claim 18, wherein the plurality of displayed images represents multiple exchanged voice mails and wherein the link to the voice data voice data comprises a link to an entire exchange of voice mails between the calling party and the called party.

* * * * *